Nov. 6, 1956 R. P. DAVIS 2,769,217
MOLD FORMING APPARATUS
Filed April 11, 1952 10 Sheets-Sheet 2

INVENTOR.
Ralph P. Davis
BY

INVENTOR.
Ralph P. Davis.

Nov. 6, 1956  R. P. DAVIS  2,769,217
MOLD FORMING APPARATUS
Filed April 11, 1952  10 Sheets-Sheet 8

INVENTOR.
Ralph P. Davis.
BY
Albert J. Henderson
HIS ATTORNEY

United States Patent Office 2,769,217
Patented Nov. 6, 1956

2,769,217

MOLD FORMING APPARATUS

Ralph P. Davis, Squantum, Mass., assignor, by mesne assignments, to Link-Belt Company, Chicago, Ill., a corporation of Illinois Application April 11, 1952, Serial No. 281,766

7 Claims. (Cl. 22—21)

This application is a continuation-in-part of my co-pending application Serial Number 186,199 filed September 22, 1950.

This invention relates to foundry mold forming apparatus and more particularly to apparatus for continuously producing baked shell-type molds by a sequence of automatic mold forming operations.

The molds to be formed by operation of the apparatus herein disclosed are produced from a dry mixture of inorganic molding material such as sand and a minor portion of plastic binder. The dry mixture is applied to pattern means which have been preheated to a temperature sufficiently high to cause the binder to soften and cement the particles of molding material together to thereby build up a shell of the desired thickness. After the mold forming material has remained on the pattern for a time sufficient to form the shell, the pattern is inverted to dump excess molding material and then returned to initial position for passage through the curing oven portion of the apparatus. Upon leaving the curing oven, the baked molds are moved by the apparatus to an unloading station where they are ejected from the patterns which then move through a preheating oven to the original loading station for further mold forming operations.

The component parts of a mold forming apparatus may be summarized as follows:

(a) Oven means divided into a preheating oven and a curing oven.

(b) A conveyer in the form of a turret with means on each turret arm for receiving and supporting pattern means.

(c) Mechanism for indexing the turret and pattern means from a loading station through the curing oven, an unloading station, the preheat oven, and back to the loading station.

(d) Mechanism for connecting a flask to the pattern means at the loading station.

(e) A movable hopper for loading mold forming material onto each pattern means for retention by the flask at the loading station.

(f) Mechanism for inverting the flask and pattern means to dumping position at the loading station and returning them to initial position.

(g) Mold ejecting means operable on the mold for removing the same from the pattern means at the unloading station after passage through the curing oven.

The apparatus of this invention is of particular advantage in forming molds of the described shell-type in large quantities. Since the molds can be set aside after completion and even stored for long periods of time before being used in casting processes, the continuous production feature of the apparatus may be put to full use at any convenient time. The apparatus may be operated under the control of one person and is of relatively simple nature embodying uncomplicated parts which are durable and rugged as required in general foundry practice.

A principal object of the invention is to produce foundry molds by relatively unskilled labor without detracting from the quality of the molds so produced.

Another object of the invention is to produce a shell-type mold of improved quality with a uniform density of mold forming material throughout the mold.

Another object of the invention is to continuously repeat the cycle of mold producing operations with different patterns if desired or with like patterns where high production rate of a specified type of mold is required.

Other objects and advantages will become apparent from the following description taken in connection with the accompanying drawings wherein.

The various parts of the apparatus will now be described referring more particularly to the drawings.

The ovens

Figure 1:
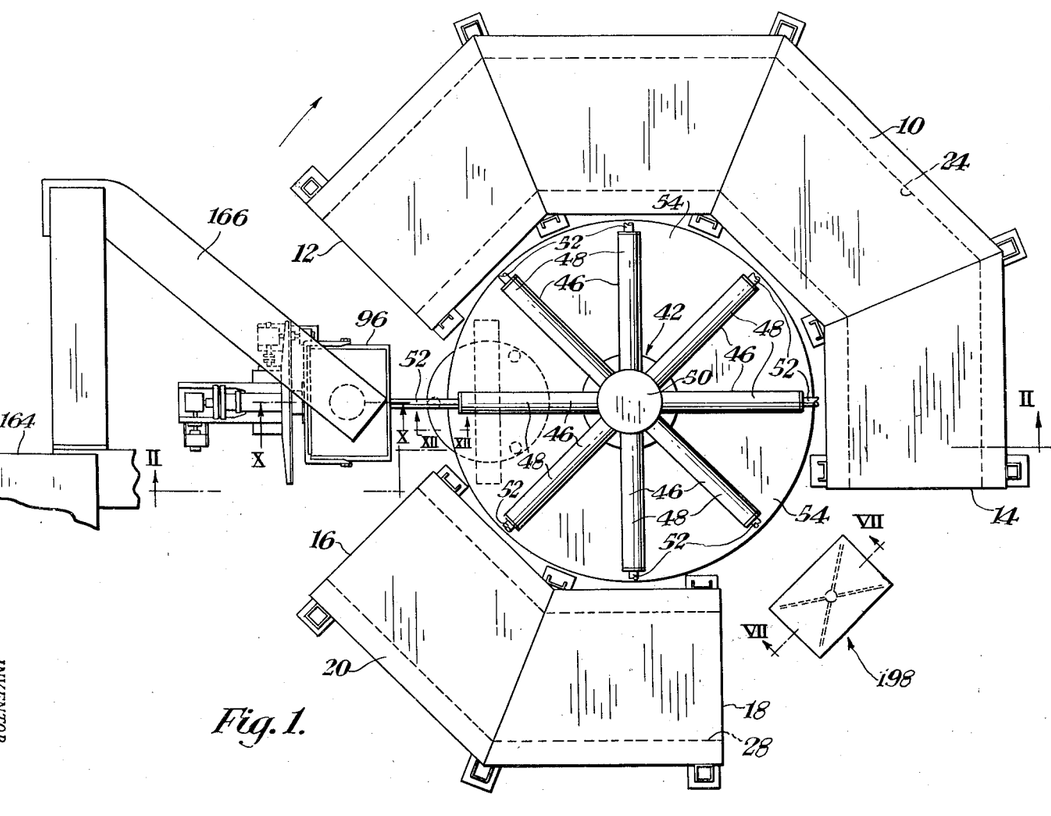
Fig. 1 is a general plan view of the molding apparatus in a somewhat schematic form.
Figures 2, 7:
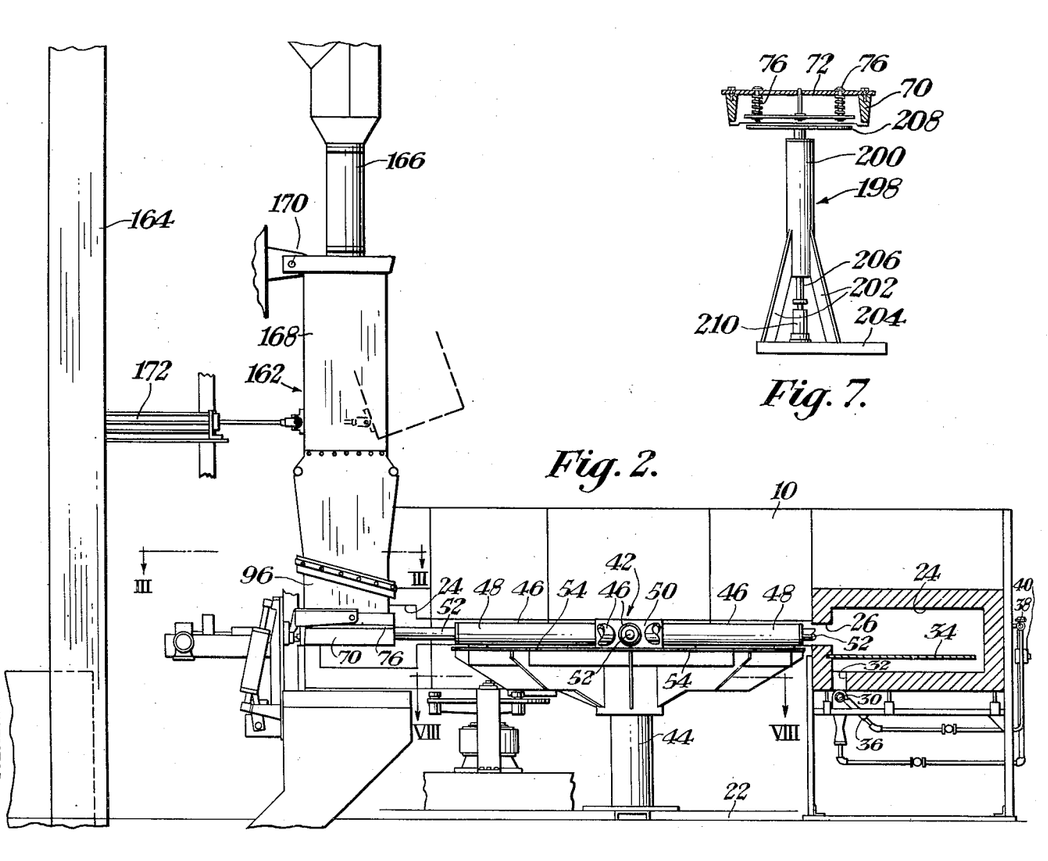
Fig. 2 is a longitudinal section taken on the line II—II of Fig. 1.
Fig. 7 is a fragmentary sectional view taken on the line VII—VII in Fig. 1.
Figure 3:
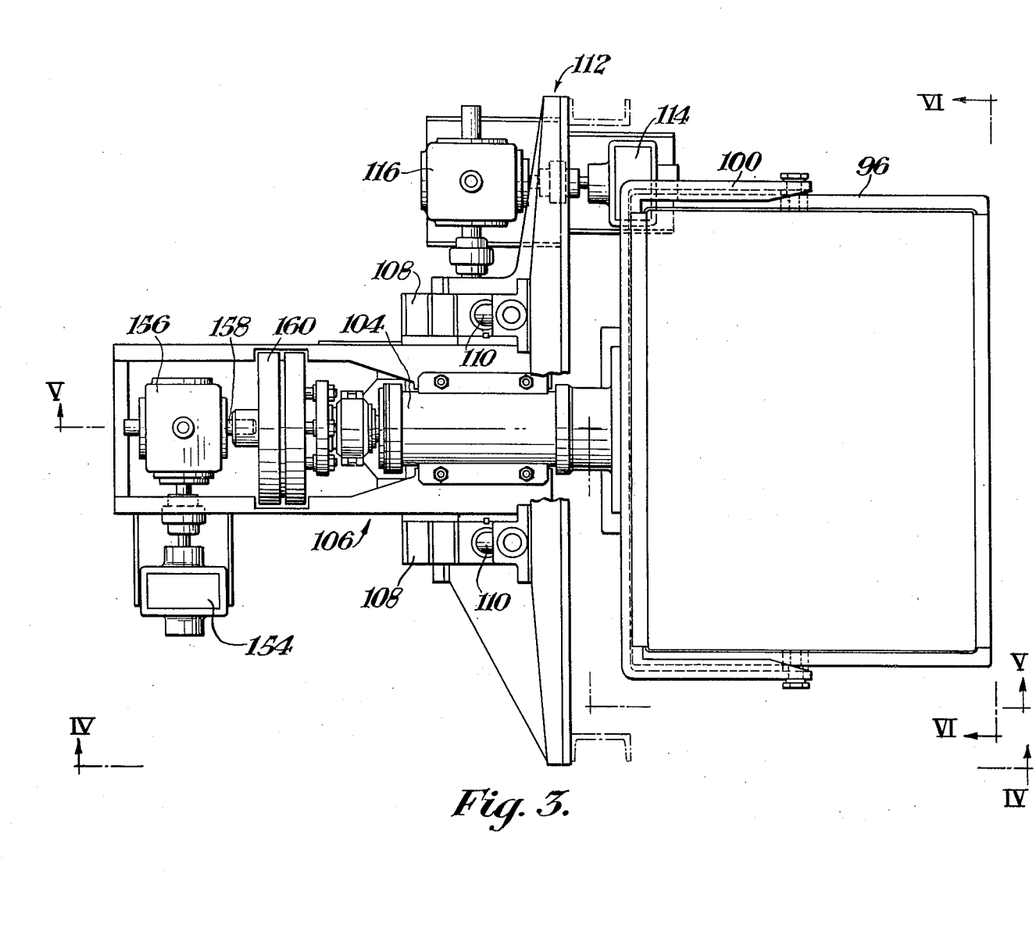
Fig. 3 is an enlarged plan view of a portion of the apparatus looking in the direction indicated by the lines III—III in Fig. 2.
Figure 4:
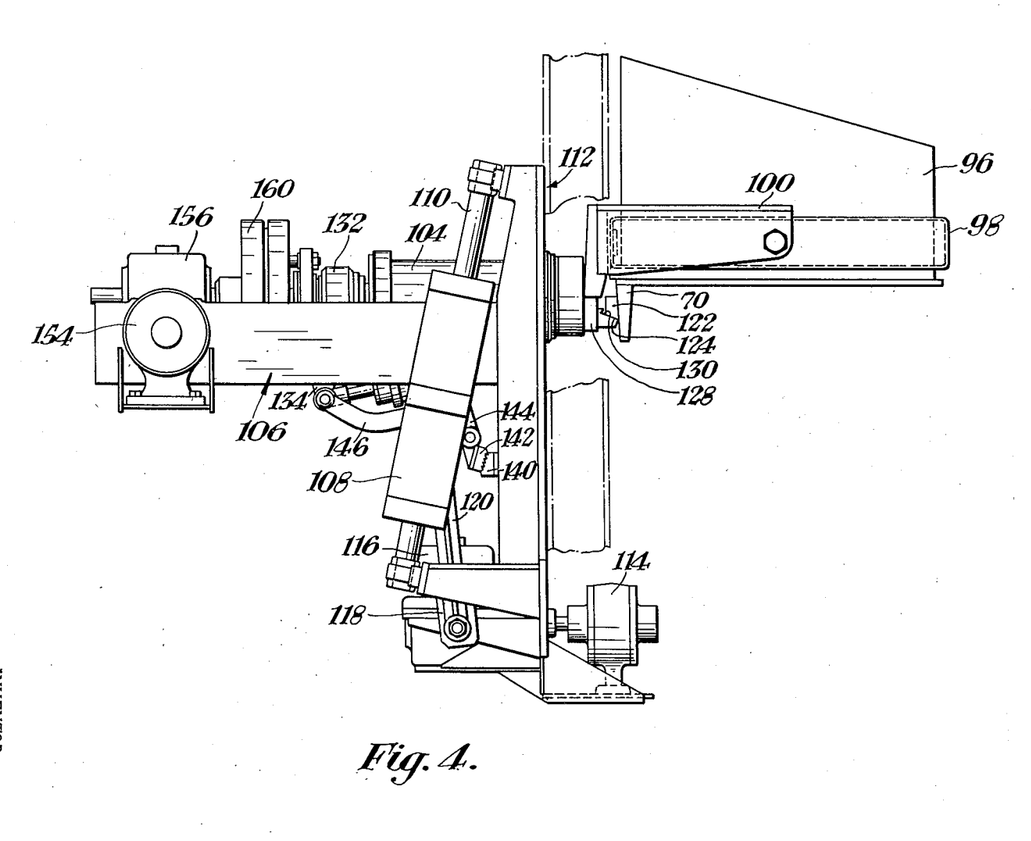
Fig. 4 is an elevation looking in the direction indicated by the lines IV—IV in Fig. 3.

As best shown in Figs. 1 and 2, a curing oven 10 of generally arcuate form is provided with open ends 12 and 14 spaced respectively from adjacent open ends 16 and 18 of a generally arcuate preheat oven 20. The ovens 10, 20 are mounted on suitable supports secured to a foundation 22 such as a concrete floor. An arcuate passageway 24 of substantially rectangular cross-section is provided in the curing oven 10 and lined with fire brick or other heat resistant material. An opening 26 formed in the inner wall of the passage 24 extends throughout the length of the passage 24 and provides access to the interior thereof. A similar passage 28 and opening (not shown) are formed in the preheat oven 20.

Heating means for the ovens 10, 20 take the form of a plurality of gas burners 30 (only one of which is shown) of tubular form located beneath the passageways 24, 28 of the ovens 10 and 20 respectively which are provided with ports 32 in their lower walls through which the flames from the burners 30 may project. A baffle plate 34 is provided in each of the ovens above the ports 32 to prevent direct impingement of the flames with articles passing through the interior of the ovens 10 and 20. Each of the burners 30 is provided with a pilot burner 36 by means of which ignition may be effected. The burners 30 are supplied with fuel from a source of gas supply through a manifold 38 connected thereto. A thermostat 40 regulates the supply of gas to the burner 30 to control the temperature of the curing oven 10 and a similar thermostat (not shown) controls the temperature of the preheat oven 20.

Conveyer or turret

A conveyer or turret, designated generally by the reference numeral 42 is provided for clockwise rotary movement about its vertical axis and includes a support 44 rotatably supported on the foundation 22. The axis of the support 44 substantially coincides with the axis of the ovens 10 and 20 so that a plurality, in this instance eight, of radial support means or turret arms 46 are adapted for movement in sequence through the oven passageways 24, 28. Each of the turret arms 46 comprises an outer cylinder 48 supported at one end on a head element 50 mounted on the support 44, each outer cylinder 48 terminating at the opposite end short of the wall of the ovens 10, 20. Rotatably mounted within each cylinder 48 is a shaft 52 which projects therefrom a sufficient distance to enter the oven passageway 24, 28 through the elongated openings in the side walls thereof. Rotation of the turret is effected by a mechanism which will be described hereinafter.

Figure 12:
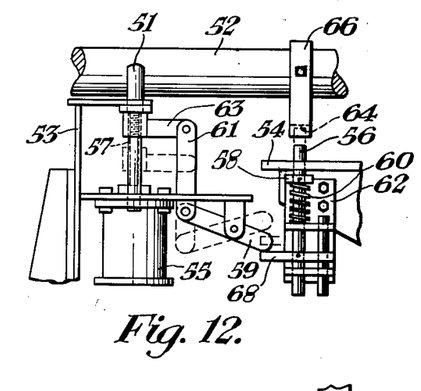
Fig. 12 is an enlarged fragmentary sectional view taken on the line XII—XII of Fig. 1.

Releasable detent means is provided for each shaft 52 for preventing rotation thereof about its horizontal axis. This means may be carried on a generally circular plate 54 carried by the support 44 in underlying supporting relation with the cylinders and extending radially beyond the outer ends thereof. Since the detent means for each shaft 52 is identical, description of one will suffice to show the structure of all. As best shown in Fig. 12, the detent or spindle locking means may comprise a pin 56 journaled for vertical slidable movement in a suitable hole formed in the plate 54 beneath the shaft 52. A collar 58 carried by the pin 56 is engageable with the underface of the plate 54 to limit upward movement of the pin 56 and a spring 60 acting between the collar 58 and a suitable bracket 62 biases the pin 56 to its uppermost position. In such position, the pin 56 extends into a recess 64 formed in a collar 66 securely mounted on the shaft 52. When the end of the pin 56 is positioned within the recess 64 rotation of the shaft 52 about its horizontal axis is precluded. However, upon downward movement of the pin 56 against the bias of the spring 60, the pin 56 is moved out of the recess 64 and the shaft 52 is freed for rotation about its horizontal center line. Downward movement of the pin 56 is effected by an operating member 68 carried on the lower end of the pin 56 and engageable by operating means to be more fully described hereinafter.

The terminal end of each shaft 52 carries a frame member 70 adapted to receive a pattern plate 72 which is mounted thereon for passage through the ovens 10 and 20. One of the pattern plates 72 is shown more clearly in Fig. 7 with ejector means in the form of spring biased pins 76 projecting therethrough. The pattern plates 72 may be all alike for producing similar molds or they may vary one from the other where different molds are desired.

The zone between the ends 12, 16 of the ovens 10, 20 respectively is termed the loading station and it is desirable to position each pattern plate accurately in a predetermined position when located therein. To this end, an indexing lock is provided and the same may comprise a bifurcated locking element 51 slidably mounted in a suitable support 53 extending from the foundation 22. The locking element is arranged to be movable vertically relative to the shaft 52 and when in its uppermost position, is adapted to straddle the shaft 52 to accurately set the angular position thereof. A fluid pressure motor 55 is carried by the support 53 and includes a piston rod 57 which is connected at one end to the locking element 51 for moving the same into and out of engagement with the shaft 52.

A shifting lever 59 is pivotally mounted on the support 53 with one end thereof extending beneath the plate 54 to be engageable with the operating member 68 of each shaft locking device when the same moves into the loading station with its corresponding shaft 52. The other end of the shifting lever 59 is connected to the locking element 51 through the linkage 61, 63 so that upward movement of the bifurcated locking element into locking position will move the shifting lever 59 in a clockwise direction thereby moving the operating element 68 against the bias of the spring 60 to release the shaft 62 for rotation about its horizontal axis.

Mechanism for indexing and rotating the turret

Figure 8:
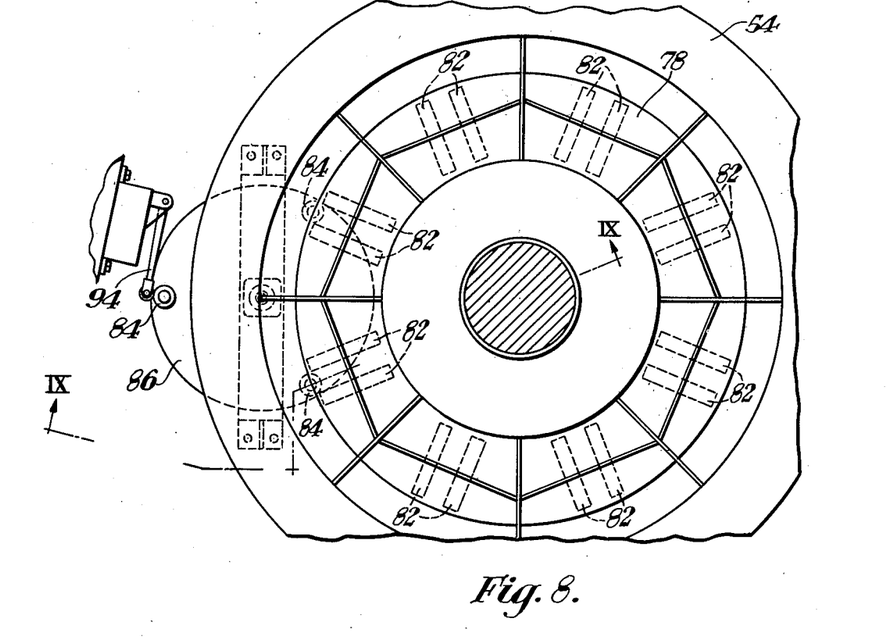
Fig. 8 is an enlarged fragmentary sectional view taken on the line VIII—VIII of Fig. 2.
Figure 9:
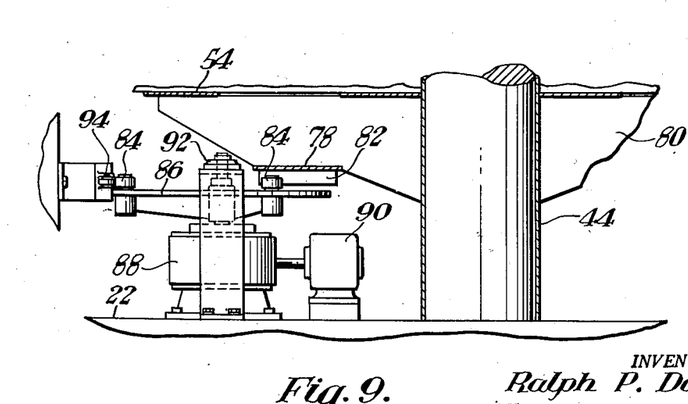
Fig. 9 is a fragmentary sectional view taken on the line IX—IX of Fig. 8.

The means employed for rotating the turret 42 is shown in Figs. 2, 8 and 9 as comprising an annular plate 78 connected to the support 44 by a plurality of radially extending brackets 80 and disposed in parallel underlying relation with the plate 54. A plurality of pairs of radially extending circumferentially spaced track elements 82 are carried on the underside of the plate 78. Each element 82 of said pairs is spaced from its associated element to thereby provide a radially extending groove or track adapted to receive a cam element or roller 84. A plurality, here shown as three, of rollers 84 are circumferentially spaced and rotatably mounted on a circular plate 86 which is positioned with a portion thereof disposed beneath the plate 78. The plate 86 is secured to the vertical output shaft of a reduction gear 88 mounted on the foundation 22 and connected to a suitable air motor 90. Supporting the free end of the reduction gear shaft is an outboard bearing 92.

The spacing of the rollers 84 and the track elements 82 is such that upon rotation of the plate 86 one of the rollers 84 will enter the space between a pair of the elements 82 and will move therealong with a substantially simple harmonic motion to effect rotation of the plate 78 and accordingly rotation of the turret 42 with smooth acceleration and deceleration despite the relatively large masses involved. The spacing of the rollers 84 and the elements 82 is also such that as one of the rollers 84 is moving out of engagement with a pair of the elements 82, another of the rollers 84 is initially engaging an adjacent pair of the elements 82 so that the plate 86 is operatively connected to the plate 78 at all times.

A control lever 94 is positioned adjacent the plate 86 to be sequentially engaged by each of the rollers 84. Engagement of the lever 94 by one of the rollers 84 is effective to terminate the supply of motive fluid to the motor 90 and thereby stop rotation of the turrent 42 when the same is in a predetermined position. Initiation of the supply of motive fluid to the motor 90 is under the control of separate means which will be discussed more fully hereinafter.

Flask and operating means therefor

The loading station is located between the ends 12, 16 of the ovens 10, 20 respectively and disposed at the loading station is a movable flask 96. The flask 96 comprises a generally rectangular open frame with the top edge thereof lying in a plane disposed at an acute angle to the plane which contains the bottom edge thereof. The flask 96 is provided with a cooling system comprising a jacket 98 encompassing the frame of the flask and adapted to provide a passage for the flow of a suitable coolant. The flask 96 is mounted for vertical movement relative to the conveyer 42 and thus may be lowered onto a pattern plate positioned at the loading station. Means is provided for clamping the flask 96 to the pattern plate and rotating the assembly of the flask 96 and pattern plate 72 about the axis of the supporting shaft 52.

More particularly, the flask 96 is pivotally mounted between the arms of a bifurcated element 100 which is secured to one end of a hollow shaft 102. The hollow shaft 102 is rotatably journaled in a cylindrical bearing 104 which is securely mouned on a vertically movable carriage indicated generally by the reference numeral 106. The carriage 106 is guided in its vertical movement by a pair of elongated bearings 108 secured to opposite sides thereof and slidably engaging a pair of fixed tracks 110, the tracks 110 being carried by a rigid framework 112 supported on the foundation 22.

To effect vertical movement of the carriage 106, a suitable air motor 114, which is mounted on the foundation 22, is connected thereto through a reduction gearing 116, crank 118 and link 120. The link 120 is pivotally connected to the carriage 106 at 122 so that rotation of the crank 118 by the motor 114 will move the pivot point 122 in a generally vertical path controlled by the coaction of the bearings 108 with the tracks 110. The tracks 110 are so arranged with respect to the index locking element 51 that the flask 96 is accurately aligned with the pattern 72 and correct contact therebetween is insured when the carriage 106 is lowered.

When the flask 96 is lowered onto the pattern plate 72, these elements are securely clamped together by means provided for this purpose. This means takes the form of a block 122 provided with a beveled face 124 and secured to the frame member 70 which supports the pattern plate 72. A shaft 126 journaled within the hollow shaft 102 for slidable and rotatable movement therein carries a dog 128 on one end thereof. The dog 128 is provided with a beveled surface 130 which is engageable with the beveled face 124 on the block 122 upon axial movement of the shaft 126. It will be apparent that engagement of the beveled surface 130 with the beveled face 124 will produce a wedging action transmitted through the frame 70 and bifurcated element 100 to force the flask 96 and pattern plate 72 firmly into engagement with each other.

To move the dog 128 into and out of engagement with the block 122, actuating means for imparting axial movement to the shaft 126 is provided. This means is here shown as comprising a collar 132 carried by the shaft 126 for axial movement therewith but being free to rotate relative thereto. A bifurcated shifting lever 134, pivoted on the carriage 106, is pivotally connected at its bifurcated end to the collar 132. The lever 134 is pivotally connected at its other end to a fluid pressure motor or power piston 136 which is also pivotally mounted on the carriage 106. The motor 136 is adapted to move the shifting lever 134 about its fixed pivot to impart axial movement to the shaft 126 and thereby move the dog 128 into and out of engagement with the block 122 carried by the frame member 70.

In a preferred embodiment of the invention, the fluid pressure motor 136 also controls the operation of a brake mechanism 138 adapted to hold the carriage 106 in a predetermined position when the dog 128 is in engagement with the block 122. The brake mechanism comprises a first brake shoe 140 mounted on the frame 112 for engagement by a second brake shoe 142 which is carried by a lever 144 pivoted on the carriage 106. A link 146 is pivotally connected at one end to the operating element of the power piston 136 and is provided at its other end with an elongated slot 148 which slidably receives a pin 150 carried by the lever 144.

Figure 5:
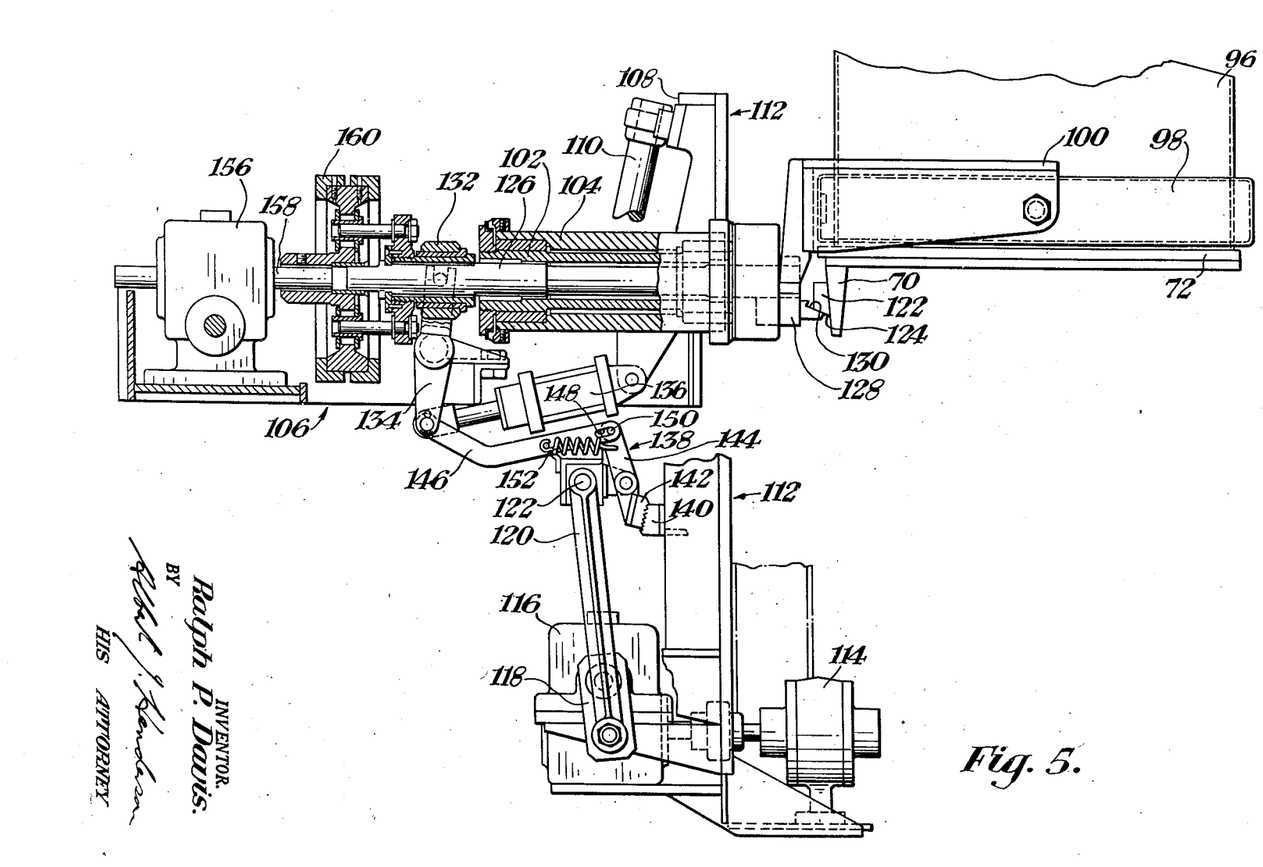
Fig. 5 is an enlarged cross-section taken on the line V—V in Fig. 3.
Figure 6:
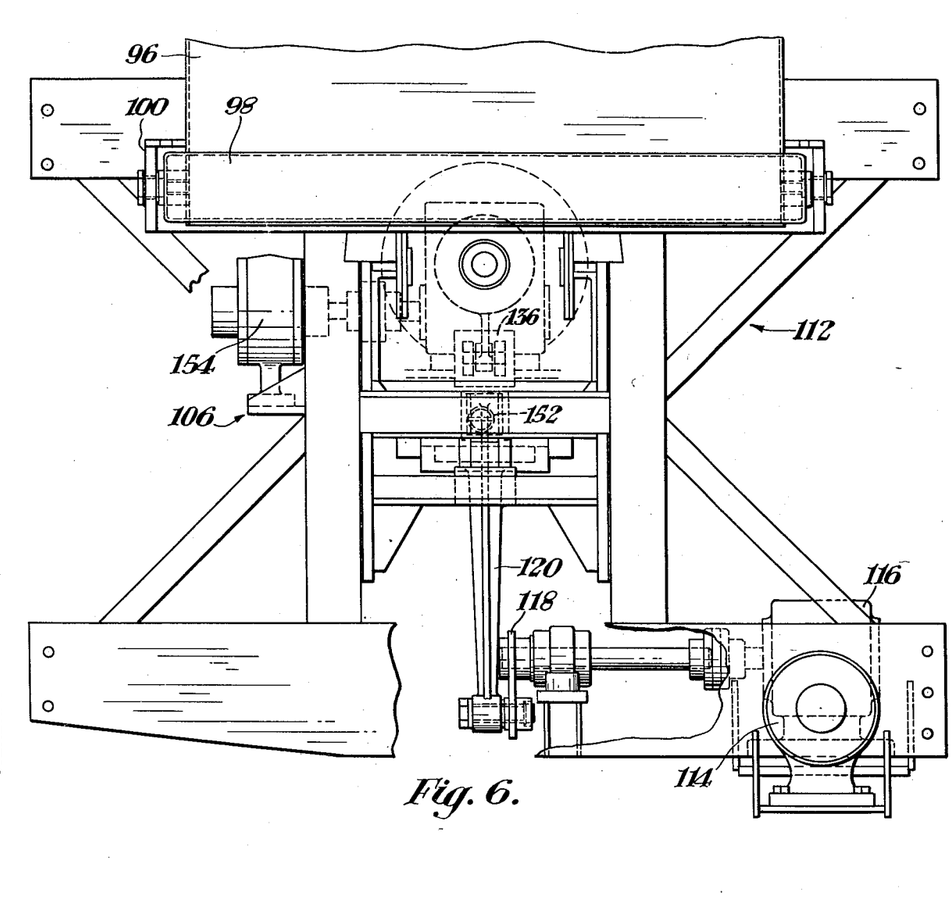
Fig. 6 is an end view of that portion of the apparatus shown in Fig. 3 looking in the direction indicated by the lines VI—VI in Fig. 3.

When the operating element of the power piston 136 is extended to hold the dog 128 in engagement with the block 122 as shown in Fig. 5 of the drawings, the link 146 is so positioned that the edges of the slot 148 exert no restraining forces on the pin 150. However, when the actuating element of the power piston 136 is positioned to hold the dog 128 out of engagement with the block 122, the link 146 is so positioned that the edge of the slot 148 engages the pin 150 to hold the lever 144 in a position maintaining the brake shoe 142 out of engagement with the brake shoe 140.

A spring 152 acts between the link 146 and the lever 144 to bias the lever 144 in a counterclockwise direction as viewed in Fig. 5 and urge the brake shoe 142 toward the brake shoe 140. Thus, when the power piston 136 is positioned to clamp the flask 96 to the pattern plate 72, the link 146 is positioned to permit the spring 152 to hold the brake shoes 142, 140 in engagement and a yieldable brake arrangement is effected. It is to be noted however that the spring 152 is precluded from producing a braking effect when the dog 128 is out of engagement with the block 122 since in such position of the parts, the edge of the slot 148 engages the pin 150 to hold the brake shoes 140, 142 apart.

As hereinbefore pointed out, it is desirable that the assembly of the flask 96 and pattern plate 72 be adapted to be inverted to dump excess molding material from the flask 96. Motor means is provided for performing this function and the same is here shown as a fluid pressure operated motor 154 mounted on the carriage 106 and connected to a reduction gearing 156 which is provided with an output shaft 158 disposed in substantial alignment with the shaft 126. The shaft 158 is connected to the shaft 126 by any suitable coupling 160 which will permit axial shifting of the shaft 126 relative to the shaft 158 while maintaining a torque transmitting relation therebetween. As this type of coupling is well known in the art, further description thereof is deemed unnecessary.

With the arrangement disclosed, torque produced by the air motor 154 will be transmitted through the reduction gear 156, shaft 158, coupling 160, shaft 126, dog 128, and block 122 to the frame member 70 to effect rotation of the assembly of the flask 96, pattern plate 72 and frame member 70 about the axis of the supporting shaft 52. It will be apparent that with such an arrangement, the axis of the shaft 126 must necessarily be substantially coincident with the axis of the shaft 52 during rotation of the flask and pattern assembly.

*Hopper*

Positioned between the ends 12, 16 of the ovens 10, 20 respectively in what has been termed the loading station is a hopper for the molding material designated generally by the reference numeral 162. An elevator 164 is supported on the foundation 22 and conveys the molding material to a chute 166 which in turn conducts the material into a movable container 168.

Figure 10:
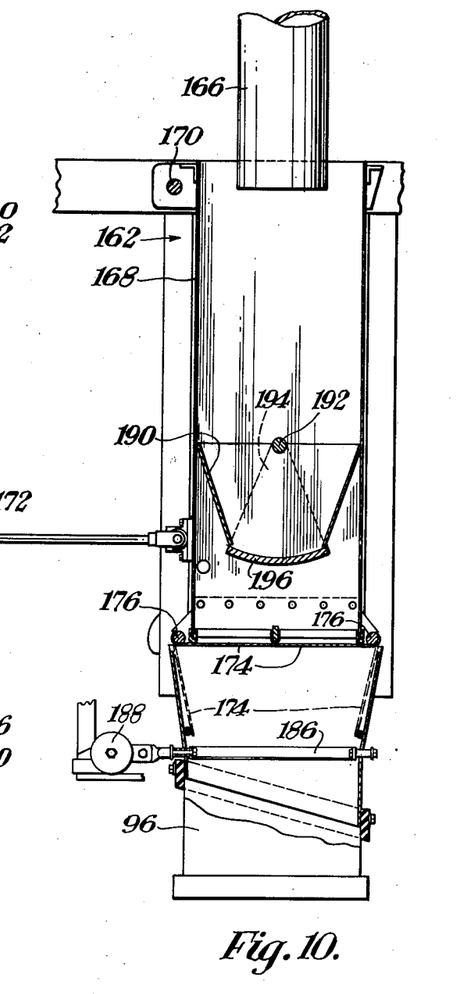
Fig. 10 is an enlarged fragmentary sectional view taken on the line X—X of Fig. 1.
Figure 11:
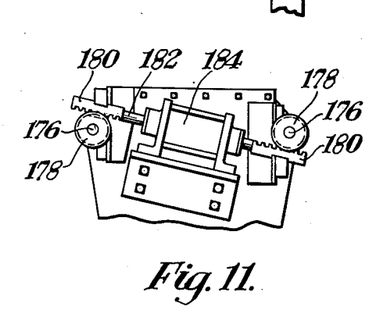
Fig. 11 is an elevation of an operating mechanism for a pair of gates within the container shown in Fig. 10.

As best shown in Figs. 2 and 10, the container 168 is pivoted at its upper end at 170 and is adapted to engage, when in the vertical position, the upper edge of the flask 96. Fluid pressure motor means here shown as a power piston 172 is connected to the container 168 to move the same about its pivot 170 to the position shown in broken lines in Fig. 2.

Positioned within the container 168 near the lower end thereof is a pair of gates 174. Each of the gates 174 is carried by a shaft 176 journaled in suitable bearings (not shown) carried by the wall of the container 168. One end of each shaft 176 is provided with a pinion 178, the pinions 178 respectively meshing with a pair of racks 180 carried on opposite ends of a piston rod 182. Limited axial movement is imparted to the rod 182 by a suitable fluid motor 184 mounted on the wall of the container 168. Upon such axial movement of the rod 182, the shafts 176 are rotated to move the gates 174 between open and closed position, the open position of the gates 174 being shown in broken lines in Fig. 10.

Positioned within the container 168 beneath the gates 174, is a screen 186 adapted to be vibrated by a suitable fluid motor 188. Also within the container 168 but above the gates 174, is a mechanism for discharging a predetermined quantity of mold forming material upon the gates 174 when the same are in closed position. Such mechanism may comprise a generally funnel-shaped wall 190 with the larger end therof secured to the walls of the container 168 and the smaller end thereof directed downwardly toward the gates 174.

A shaft 192 extends through the wall 190 and the outer ends thereof pivotally support a pair of plates 194 each of which is in the shape of a segment of a circle with the arcuate edge thereof remote from the shaft 192. An arcuate plate 196 is secured to the arcuate edges of the plates 194 and underlies the open end of the funnel-shaped wall 190 so that when the container 168 is in the vertical position as shown in Fig. 10, the arcuate plate 196 will effectively close the port defined by the smaller end of the funnel-shaped wall 190 and prevent flow of mold forming material therethrough. However, when the container 168 is moved out of the vertical position to the broken line position shown in Fig. 2, the assembly of the sector shaped plates 194 and arcuate plate 196 will pivot about the shaft 192 under the influence of gravity to thereby open the port defined by the smaller end of the funnel-shaped wall 190 and permit mold forming material to flow therethrough onto the gates 174.

Upon return of the container 162 to the vertical position, the arcuate plate 196 will again assume the position shown in Fig. 10 under the influence of gravity and the supply of mold forming material to the space above the gates 174 will be cut off. It will thus be apparent that movement of the container 168 out of engagement with the flask 96 and subsequent return movement thereof into engagement with the flask 96 will be effective to deposit a predetermined quantity of mold forming material upon the gates 174.

When the gates 174 are moved to open position by the fluid pressure motor 184, such predetermined quantity of mold forming material will drop as a slug onto the vibrating screen 186 which will break the same up into a shower of finely divided particles. It has been found that such a shower of finely divided falling particles will produce a mold of superior quality since the small particles do not pyramid on flat pattern surfaces to deflect other particles and leave voids adjacent vertical pattern surfaces. With a shower of fine particles, the molding material packs very closely around all vertical and inclined pattern surfaces.

*Mold ejecting means*

Positioned between the end 14 of the oven 10 and the end 18 of the oven 20 in what may be termed the unloading station, is the mold ejecting mechanism designated generally by the reference numeral 198. The ejecting mechanism 198 is shown in Figs. 1 and 7 as comprising a cylindrical housing 200 supported on a plurality of leg members 202 from a base 204 which is secured to the foundation 22. The housing 200 contains an axially movable rod member 206 carrying an ejecting plate 208 beyond the end of the housing 200. Movement of the rod member 206 is effected by a fluid motor device such as an air motor 210 which is mounted between the base 204 and the rod member 206 for this purpose. Movement of the plate 208 toward and away from the housing 200 will serve to operate the ejector pins 76 of the pattern plate 72 and remove the mold formed thereon after passage through the curing oven 10.

*Control system*

Figure 13:
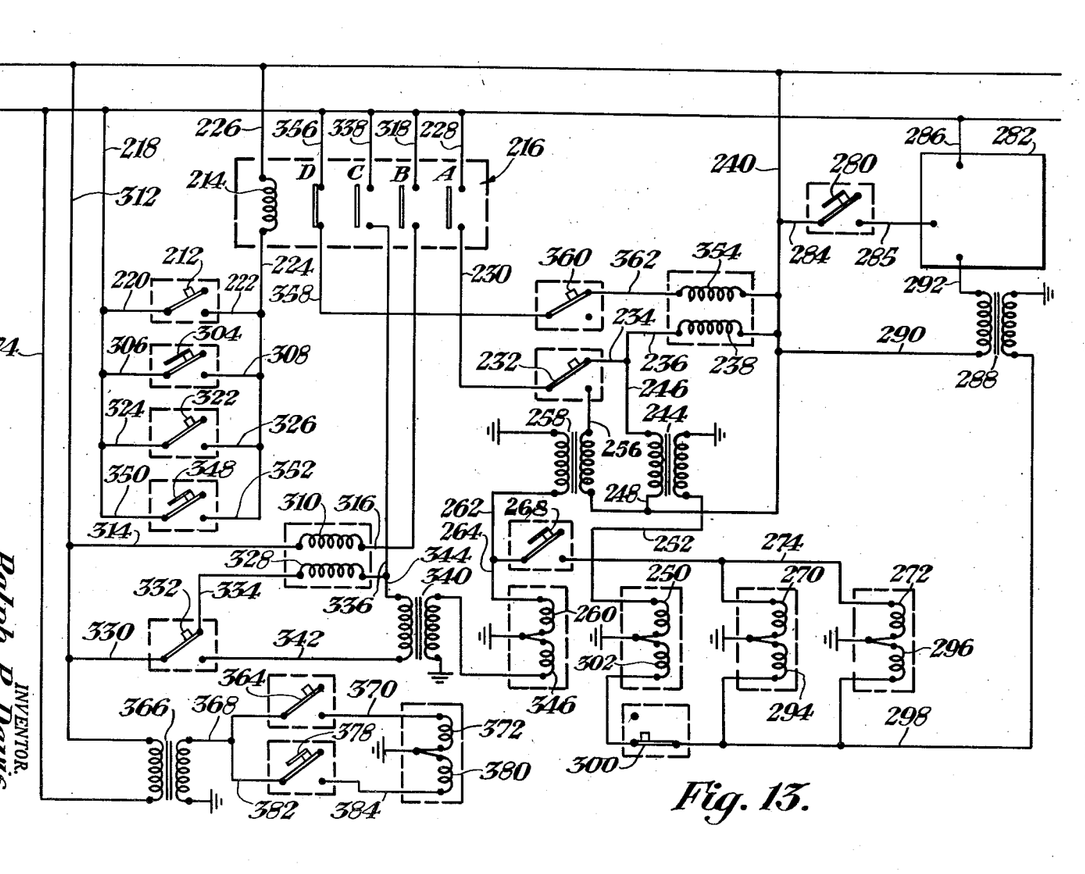
Fig. 13 is a diagrammatic showing of the electrical control system for the molding apparatus.
Figure 14:
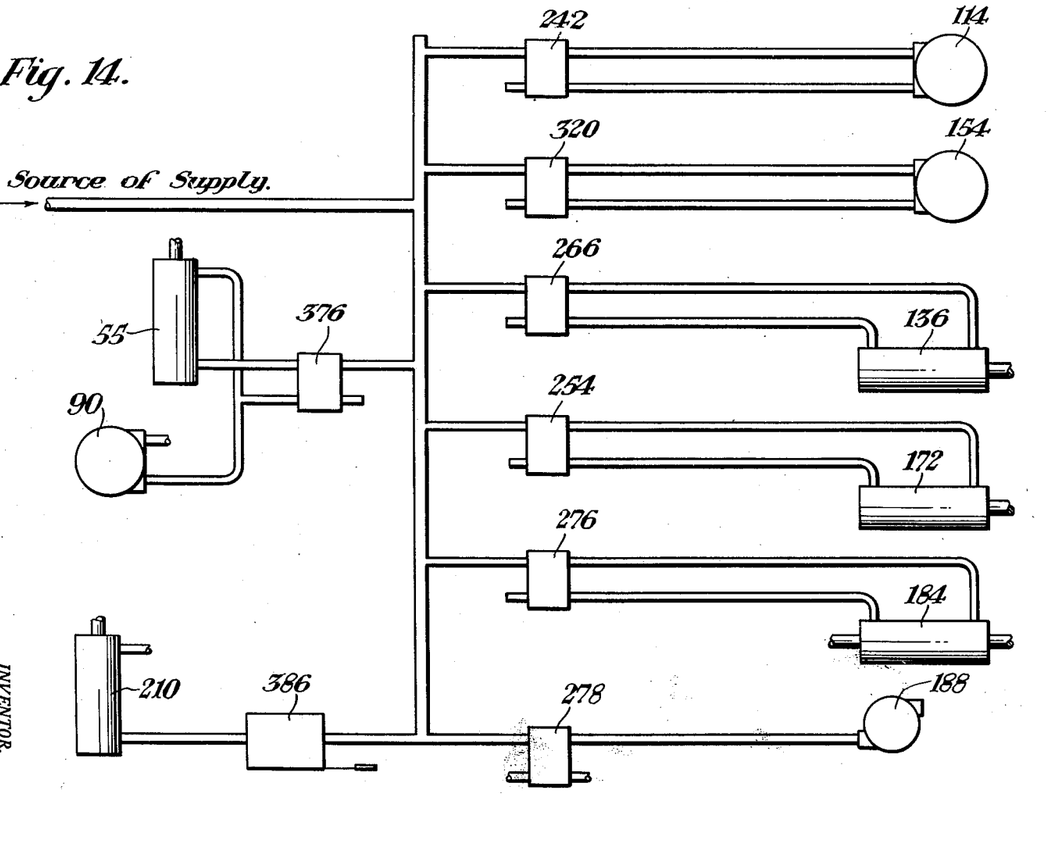
Fig. 14 is a diagrammatic showing of the fluid pressure control system for the molding apparatus.

Referring to Figs. 13 and 14 showing the control mechanism for accomplishing the various functions of the hereinbefore described apparatus, it will be observed that both fluid pressure and electrical energy are utilized. The details of the fluid pressure and electrical control systems will be brought out in a description of the operation of the apparatus which follows.

*Operation*

In general terms, the steps which comprise the operation of the apparatus of this invention are as follows:
1. A preheated pattern 72 is positioned at the loading station and the flask 96 is lowered onto the same while the container 168 moves into engagement with the flask 96.
2. The gates 174 open and permit a quantity of inorganic molding material to be dropped onto the pattern plate to be retained by the flask.
3. The container 168 swings away from the flask 96 and the assembly of the pattern plate 72 and flask 96 is rotated to dump excess mold forming material therefrom. The assembly of the pattern plate 72 and flask 96 is then rotated to its original position and the flask 96 is raised out of engagement with the pattern plate 72.
4. The turret 42 is rotated or indexed to move the pattern plate with the mold forming material thereon into the curing oven 10 while simultaneously moving a preheated pattern plate out of the preheat oven 20 to the loading station.
5. The above steps are repeated with each indexing step moving a pattern plate with a cured mold thereon out of the curing oven 10 to the unloading station where the finished mold is ejected therefrom. Each indexing step also moves a pattern out of the preheat oven 20 to the loading station beneath the flask 96.

The detailed operation of the apparatus is as follows:
Assuming that a pattern plate 72 is positioned in the loading station beneath the flask 96 which is in its raised position and referring more particularly to Figs. 13 and 14, operation of the apparatus is initiated by the operator's momentarily closing a switch 212 which energizes the coil 214 of a sequence relay 216 through a circuit which may be traced as follows: from line wire L2 through wire 218, wire 220, switch 212, wire 222, wire 224, coil 214, and wire 226 to line wire L1. Energization of coil 214 closes a first switch A of a sequence relay 216 which completes a circuit which may be traced as follows: from line wire L2, through wire 228, switch A, wire 230, switch 232, wire 234, wire 236, coil 238, and wire 240 to line wire L1. Coil 238 is operatively associated with a two-way control valve 242 adapted to control the supply of motive fluid to the fluid pressure motor 114 which operates the carriage 106. Energization of coil 238 upon completion of the above-described circuit will cause the valve 242 to admit motive fluid to the motor 114 causing the same to apply power to the carriage 106 through the reduction gear 116, crank 118, and link 120 to move the carriage 106 and associated flask 96 down to the position shown in Figs. 2, 4, 5 and 6. The flask 96 is now in engagement with the pattern plate 72.

Closing of the switch A also completes a circuit through the primary of the transformer 244, which circuit may be traced as follows: from line wire L2, through wire 228, switch A, wire 230, switch 232, wire 234, wire 246, primary winding of transformer 244, wire 248, and wire 240 to line wire L1. Energization of the primary winding of the transformer 244 energizes the secondary winding of said transformer which in turn energizes a coil 250 through wire 252. Coil 250 is operatively associated with a two-way valve 254 adapted to control the supply of motive fluid to the fluid pressure motor 172 which moves the container 168 about its pivot 170.

When the coil 250 is energized, the valve 254 is actuated to supply motive fluid to the fluid pressure motor 172 to swing the container 168 about its pivot 170 to its vertical position wherein the lower portion engages the upper edge of the flask 96. The switch 232 is arranged to be actuated by the flask 96 when the same moves to its lower position and when the flask 96 so moves, the switch 232 is positioned to complete a circuit which may be traced as follows: from line wire L2 through wire 228, switch A, wire 230, switch 232, wire 256, primary winding of a transformer 258, and wire 240 to line wire L1.

When the primary winding of the transformer 258 is energized, the secondary winding of said transformer is also energized and serves to energize a coil 260 through wires 262 and 264. The coil 260 is operatively associated with a four-way valve 266 adapted to control the supply of motive fluid to the fluid pressure motor 136 which actuates the dog 128. When the coil 260 is energized, the valve 266 admits motive fluid to the pressure motor 136 to cause the same to rotate the shifting arm 134 in a clockwise direction as viewed in Fig. 5 to thereby shift the shaft 126 and attached dog 128 to the right as viewed in Fig. 5. Such movement of the dog 128 causes the beveled face 130 thereof to engage the beveled face 124 of the block 122 and securely clamp the frame 70, pattern plate 72 and flask 96 together.

A switch 268 is positioned to be closed by the container 168 when the same moves to the vertical position as shown in Fig. 1 of the drawings. Thus, movement of the container 168 into engagement with the flask 96 closes the switch 268 and connects a pair of coils 270, 272 in parallel between the secondary of transformer 258 and ground through a wire 274. The coil 270 is operatively associated with a four-way valve 276 adapted to control the supply of motive fluid to the fluid pressure motor 184 which actuates the gates 174. When the coil 270 is energized, the valve 276 is moved to a position wherein fluid under pressure is supplied to the pressure motor 184 to open the gates 174 permitting molding material thereon to drop onto the screen 186.

The coil 272 is operatively associated with a valve 278 adapted to control the supply of motive fluid to the fluid pressure motor 188 for vibrating the screen 186 and when the coil 272 is energized, the valve 278 is positioned to admit motive fluid to the motor 188. The mold forming material dropped through the gates 174 is thus broken up into finely divided particles by the vibrating screen 186 and falls in such finely divided form onto the pattern plate 72. Since the pattern plate 72 has been preheated in the preheat oven 20 to a temperature sufficiently high to effect fusion of the binder in the mold forming material, the binder softens and cements together the particles of molding material thereby building up a shell contiguous the pattern plate.

A switch 280 is positioned to be momentarily moved to closed position when the gates 174 move between open and closed positions. Thus, when the gates 174 move to open position, the switch 280 is momentarily closed connecting a time delay mechanism 282 across line wires L1, L2 through a circuit which may be traced as follows: from line wire L1 through wire 240, wire 284, switch 280, wire 285, timer 282 and wire 286 to line wire L2. After a predetermined time delay, the timer 282 connects the primary winding of a transformer 288 across line wires L1, L2 through a circuit which may be traced as follows: from line wire L1 through wire 240, wire 290, primary winding of transformer 288, wire 292, timer 282, and wire 286 to line wire L2.

A pair of coils 294, 296 are each connected to ground and are connected in parallel to the secondary winding of the transformer 288 through a wire 298. The secondary winding of the transformer 288 is also grounded so that upon energization of the primary winding of said transformer, the coils 294 and 296 are energized. The coil 294 is operatively associated with the valve 276 and when energized is effective to position the valve 276 to supply motive fluid to the fluid pressure motor 184 in such a way as to cause the same to close the gates 174. The coil 296 is operatively associated with the valve 278 and when energized is effective to position the valve 278 to terminate the supply of motive fluid to the vibrator motor 188 thereby terminating the vibrating motion of the screen 186. It will thus be apparent that the gates 174 are closed and the vibrating motion of the screen 186 is terminated at the end of a predetermined time interval initiated by the opening of the gates 174.

A switch 300 is positioned to be closed by the gates 174 when the same are moved to closed position and when closed connects a coil 302 with the secondary winding of transformer 288 through wire 298. The coil 302 is connected to ground and will therefore be energized upon energization of the secondary winding of the transformer 288 when the switch 300 is closed. As the gates 174 move to closed position, the switch 280 is once again momentarily closed to initiate operation of the timer 282.

After a predetermined time interval, the timer 282 once again connects the primary winding of the transformer 288 across line wires L1, L2 through the circuit previously traced. The coil 302 is then energized. The coil 302 is operatively associated with the valve 254 and when energized is effective to position the valve 254 to admit fluid under pressure to the fluid pressure motor 172 in such a manner that the motor 172 will move the container 168 about its pivot 170 and out of engagement with the flask 96. As the container 168 moves away from the flask 96, the plate 196 moves relative to the tapered wall 190 to open the port defined by the smaller end thereof and permit mold forming material to flow onto the closed gates 174.

A switch 304 is positioned to be momentarily closed by the container 168 as the same swings away from its vertical position over the flask 96. Closing of the switch 304 completes a circuit for energizing the coil 214 of the sequence relay 216 which circuit may be traced as follows: from line wire L2 through wire 218, wire 306, switch 304, wire 308, wire 224, coil 214, and wire 226 to line wire L1. Such momentary energization of the coil 214 is effective to open the switch A of the sequence relay 216 and close a second switch B thereof.

Closing of the switch B completes a circuit through a coil 310 as follows: from line wire L1 through wire 312, wire 314, coil 310, wire 316, switch B, and wire 318 to line wire L2. The coil 310 is operatively associated with a two-way valve 320 adapted to control the supply of motive fluid to the fluid pressure motor 154 for effecting rotation of the flask and pattern plate assembly.

When the coil 310 is energized, the valve 320 is positioned to admit motive fluid to the fluid pressure motor 154 for causing rotation thereof in one direction thereby dumping excess mold forming material from the flask. As hereinbefore set forth, torque is transmitted from the fluid pressure motor 154 to the flask 96 through the reduction gear 156, output shaft 158, coupling 160, shaft 126, and dog 128.

When the flask 96 has rotated through approximately 180°, a switch 322 is operatively engaged thereby and momentarily closed to complete a circuit through the coil 214 of the sequence relay 216 as follows: from line wire L2 through wire 218, wire 324, switch 322, wire 326, wire 224, coil 214, and wire 226 to line wire L1. Such energization of the coil 214 of the sequence relay 216 is effective to open the switch B and close a third switch C thereof.

Opening of the switch B of sequence relay 216 is effective to deenergize coil 310 thereby cutting off the supply of motive fluid to the fluid pressure motor 154 and terminating rotation of the flask 96. When the switch C of the sequence relay 216 closes, a coil 328 is energized through a circuit which may be traced as follows: from line wire L1 through wire 312, wire 330, switch 332, wire 334, coil 328, wire 336, switch C, and wire 338 to line wire L2. The coil 328 is operatively associated with the valve 320 and when energized is effective to position the valve 320 to supply motive fluid to the fluid pressure motor 154 in such a way that the rotation thereof is reversed and the flask is rotated to its initial position through the mechanism hereinbefore described.

Rotation of the flask 96 is terminated when the same returns to its initial position by operative engagement of the flask 96 in such position with the switch 332, such engagement being effective to move the switch 332 to break the previously traced energizing circuit for the coil 328. Deenergization of the coil 328 causes the valve 320 to terminate motive fluid supply to the fluid pressure motor 154 and preclude further rotation of the flask 96.

Operative engagement of the switch 332 by the flask 96 is not only effective to deenergize the coil 328 but also moves the switch 332 to a position wherein a circuit for energizing the primary winding of a transformer 340 is completed. This circuit may be traced as follows: from line wire L1 through wire 312, wire 330, switch 332, wire 342, primary winding of transformer 340, wire 344, wire 336, switch C of sequence relay 216, and wire 338 to line wire L2. One terminal of the secondary winding of the transformer 340 is connected to ground and the other end thereof is connected to a coil 346 which in turn is grounded so that energization of the secondary winding of the transformer 340 effects energization of the coil 346.

The coil 346 is operatively associated with the valve 266 and when energized is effective to position the valve 266 to admit motive fluid to the fluid pressure motor 136 in such a manner that the motor 136 will move the shifting arm 134 in a counterclockwise direction as viewed in Fig. 5. The shaft 126 is thus shifted axially to the left as viewed in Fig. 5 and the dog 128 carried thereby is moved out of engagement with the block 122 to free the flask 96 for movement out of engagement with the pattern plate 72.

A switch 348 is arranged to be momentarily closed by the dog shifting mechanism when the same moves the dog 128 out of engagement with the block 122. Closing of the switch 348 momentarily energizes the coil 214 of the sequence relay 216 through the following circuit: from line wire L2 through wire 218, wire 350, switch 348, wire 352, wire 224, coil 214, and wire 226 to line wire L1. Such momentary energization of coil 214 is effective to open the switch C of sequence relay 216 and close a fourth switch D thereof thereby energizing a coil 354 through the following circuit: from line wire L2, through wire 356, switch D, wire 358, a switch 360, wire 362, coil 354, and wire 240 to line wire L1.

The coil 354 is operatively associated with the valve 242 and when energized is effective to position the valve 242 to admit motive fluid to the fluid pressure motor 114 to cause rotation of the same in a direction opposite to that previously described. Such rotation of the pressure motor 114 is effective to rotate the crank 118 in a clockwise direction as viewed in Fig. 5 to move the carriage 106 upward thereby moving the flask 96 out of engagement with the pattern plate 72.

When the flask 96 has moved through a predetermined distance, the switch 360 is operatively engaged thereby and moved to an open position to break the previously traced energizing circuit for the coil 354 thereby permitting the valve 242 to move to closed position and terminate the supply of motive fluid to the fluid pressure motor 114.

The loading operation is now complete and indexing of the turret 42 to move the loaded pattern plate into the curing oven 10 must be performed. To initiate the indexing operation, the operator momentarily closes a switch 364 which completes a circuit which may be traced as follows: from ground to one terminal of the secondary winding of a transformer 366 through the secondary winding of the transformer 366, wire 368, switch 364, wire 370, and a coil 372 to ground. The primary winding of the transformer 366 is connected across line wires L1, L2 by wires 312, 374.

Thus, closing of the switch 364 is effective to energize the coil 372. The coil 372 is operatively associated with a four-way valve 376 adapted to control the supply of motive fluid to the fluid pressure motor 90 and the fluid pressure motor 55. When the coil 372 is energized, the valve 376 is positioned to admit motive fluid to the fluid pressure motor 55 in such a manner as to cause the same to lower the bifurcated index locking element 51 thereby freeing the turret 42 and at the same time moving the shifting lever 59 in a counterclockwise direction as viewed in Fig. 12. Such movement of the lever 59 will release the pin 56 for movement under the bias of the spring 60 into engagement with the collar 66 for preventing rotation of the shaft 52 about its horizontal axis.

When the valve 376 is so positioned, fluid under pressure is also admitted to the fluid pressure motor 90 for causing the same to rotate the plate 86 through the reduction gear 88 to thereby rotate the turret 42 about its support 44. When the fluid pressure motor 90 has rotated the turret 42 through an angle sufficient to bring a second pattern plate into alignment with the flask 96, one of the rolls 84 carried on the plate 86 contacts the control lever 94 to momentarily close a switch 378. Closing of the switch 378 is effective to connect a coil 380 across the secondary of the transformer 366 through a circuit which may be traced as follows: from the upper terminal of the secondary winding of the transformer 366 through wire 368, wire 382, switch 378, wire 384, and coil 380 to ground.

The coil 380 is operatively associated with the valve 376 and when energized is effective to position the valve 376 to terminate the supply of motive fluid to the fluid pressure motor 90 and thereby terminate rotation of the turret 42. When the coil 380 is energized, the valve 376 is also positioned to admit motive fluid to the fluid pressure motor 55 in such a manner that the indexing locking element 51 is moved upward to straddle a second shaft 52 and the shifting lever 59 is moved in a clockwise direction as viewed in Fig. 12 to move the pin 56 out of engagement with the collar 66 on said second shaft 52 which is now aligned with the flask at the loading station. The apparatus is now ready for repetition of the loading operation which, as hereinbefore described, is initiated by the closing of the switch 212 by the operator.

It will be understood that as each pattern is indexed out of the preheat oven 20 to the loading station, a loaded pattern plate is indexed from the loading station into the curing oven 10 and a pattern plate with a cured mold thereon is indexed to the ejection or unloading station where the finished mold is ejected from the pattern plate by the ejector pins 76 actuated by the fluid pressure motor 210. Supply of motive fluid to the motor 210 is under the control of a manually operated valve 386. It is also to be understood that the described indexing operation is effective to move the pattern plates from the ejection station through the preheat oven 20 to the loading station.

The operation is thus continuous and semi-automatic under control of a single operator since, while an ejecting operation is being conducted, the loading, dumping, baking and preheating operations are being performed at the other stations. It will be apparent that many changes may be made in the details of construction and arrangements of parts and that certain phases of the cycle may be rearranged or omitted without departing from the scope of the invention as defined in the appended claims.

It is claimed and desired to secure by Letters Patent:

1. In a mold forming apparatus, the combination of first oven means having a passageway therethrough, second oven means having a passageway therethrough, a loading station, an unloading station, a carrier movable sequentially through said first oven passageway, said loading station, said second oven passageway, and said unloading station, support means mounted on said carrier to be movable therewith and rotatable relative thereto, pattern means on said support means, a rotatable flask at said loading station, means for connecting said flask with said pattern means, means for inverting the assembly of said support means, said pattern means, and said flask means for dumping excess mold forming material and thereafter returning said assembly to initial position, means for disengaging said flask means from said pattern means, and means for removing a mold from said pattern means at said unloading station.

2. In a mold forming apparatus, the combination of oven means having a passageway therethrough, a loading station, an unloading station, a carrier movable sequentially through said loading station, said oven passageway, and said unloading station, support means mounted on said carrier to be movable therewith and rotatable relative thereto, pattern means on said support means, flask means at said loading station, means for moving said flask means into engagement with said pattern means, means for clamping said flask means to said pattern means, means at said loading station for loading mold forming material onto said pattern means for retention by said flask means, means for inverting the assembly of said support means, said pattern means, and said flask means for dumping excess mold forming material and thereafter returning said assembly to initial position, and means for removing a finished mold from said pattern means at said unloading station.

3. In a mold forming apparatus, the combination of oven means having a passageway therethrough, a loading station, an unloading station, a carrier movable sequentially through said loading station, said oven passageway, and said unloading station, support means mounted on said carrier to be movable therewith and rotatable relative thereto, pattern means on said support means, flask means at said loading station, means for inverting said flask means, means for positioning said pattern means for engagement by said flask means, means for moving said flask means into engagement with said pattern means, means for clamping said flask means to said pattern means, means at said loading station for loading mold forming material onto said pattern means for retention by said flask means, means for actuating said flask inverting means and thereby inverting the assembly of said support means, said pattern means and said flask mounting means for dumping excess mold forming material and thereafter returning said assembly to initial position, means for disengaging said flask means from said pattern means, and means for removing a finished mold from said pattern means at said unloading station.

4. In a mold forming apparatus, the combination of a conveyer, a loading station, a plurality of pattern means rotatably mounted on said conveyer for movement therewith, rotatable flask means at said loading station and movable relative to said conveyer for engagement with a selected one of said pattern means, means for inverting said flask means, means for clamping said flask means to said one pattern means, means for loading mold forming material upon said one pattern means for retention by said flask means, and means for actuating said flask inverting means for rotating the assembly of said flask means and one pattern means for dumping excess mold forming material therefrom.

5. In a mold forming apparatus, the combination of a conveyer, a plurality of rotatable pattern means mounted on said conveyer for movement therewith, a carriage movable relative to said conveyer, rotatable flask means on said carriage, means for moving said carriage to move said flask means into engagement with a selected one of said pattern means, means for clamping said flask means to said one pattern means with the axis of rotation of said flask means coincident with the axis of rotation of said one pattern means, means for loading mold forming material onto said one pattern means for retention by said flask, and means movable with said carriage for rotating the assembly of said flask means and one pattern means for dumping excess mold forming material therefrom.

6. In a mold forming apparatus, the combination of a conveyer, a plurality of pattern means rotatably mounted on said conveyer for movement therewith, a carriage movable relative to said conveyer, rotatable flask means on said carriage, indexing means cooperable with said conveyer for aligning selected pattern means with said flask means, means for moving said carriage to move said flask means into engagement with said selected pattern means, means for clamping said flask means to said selected pattern means with the axis of rotation of the former coincident with the axis of rotation of the latter, means for loading mold forming material onto said selected pattern means for retention by said flask means, and means movable with said carriage for rotating the assembly of said flask means and said selected pattern means for dumping excess mold forming material therefrom.

7. In a mold forming apparatus, the combination of oven means having a passageway therethrough, a loading station, a carrier movable through said loading station and said oven passageway, pattern means on said carrier, flask means at said loading station and movable into engagement with said pattern means, means responsive to movement of said flask means into engagement with said pattern means for loading mold forming material onto said pattern means for retention by said flask means, means for inverting the assembly of said pattern means and said flask means for dumping excess mold forming material therefrom and thereafter returning the same to its initial position, means responsive to movement of said assembly to said initial position for moving said flask means out of engagement with said pattern means, and means responsive to movement of said flask means out of engagement with said pattern means for moving said carrier and thereby said pattern means into said oven passageway.

References Cited in the file of this patent

UNITED STATES PATENTS

| | | |
|---|---|---|
| 776,696 | Sherman | Dec. 6, 1904 |
| 1,356,870 | Maeda | Oct. 26, 1920 |
| 1,554,972 | Merwin | Sept. 22, 1925 |
| 1,832,626 | Geddes | Nov. 17, 1931 |
| 2,049,967 | Luton | Aug. 4, 1936 |
| 2,496,170 | Mann | Jan. 31, 1950 |
| 2,542,243 | Gedris | Feb. 20, 1951 |
| 2,588,669 | Taccone | Mar. 11, 1952 |
| 2,669,758 | Valyi | Feb. 23, 1954 |
| 2,695,431 | Davis | Nov. 30, 1954 |

FOREIGN PATENTS

| | | |
|---|---|---|
| 627,154 | Great Britain | July 29, 1949 |
| 832,936 | Germany | Mar. 3, 1952 |

OTHER REFERENCES

Modern Metals, "The Croning Process," October 1950, pages 22–24.